United States Patent
Sharpe et al.

(10) Patent No.: US 7,107,289 B2
(45) Date of Patent: Sep. 12, 2006

(54) PROCESS FILE SYSTEMS HAVING MULTIPLE PERSONALITIES AND METHODS THEREFOR

(75) Inventors: Edward J Sharpe, Los Gatos, CA (US); Louis D. Huemiller, Jr., San Jose, CA (US); Sushanth Rai, Sunnyvale, CA (US); Zhi-Hui Xu, Sunnyvale, CA (US)

(73) Assignee: Hewlett-Packard Development Company, Houston, TX (US)

( * ) Notice: Subject to any disclaimer, the term of this patent is extended or adjusted under 35 U.S.C. 154(b) by 478 days.

(21) Appl. No.: 10/293,043

(22) Filed: Nov. 12, 2002

(65) Prior Publication Data
US 2004/0093356 A1   May 13, 2004

(51) Int. Cl.
*G06F 12/00* (2006.01)
*G06F 17/30* (2006.01)
*G06F 7/00* (2006.01)
*G06F 3/00* (2006.01)
*G06F 9/44* (2006.01)
*G06F 9/46* (2006.01)
*G06F 13/00* (2006.01)

(52) U.S. Cl. .................... 707/200; 707/1; 719/321
(58) Field of Classification Search ................ 707/101, 707/1, 200; 719/321; 711/170; 718/100
See application file for complete search history.

(56) References Cited

U.S. PATENT DOCUMENTS 5,459,867 A * 10/1995 Adams et al. .............. 719/321
5,627,996 A * 5/1997 Bauer ........................ 703/20
2003/0051117 A1 * 3/2003 Burch et al. ............... 711/173

OTHER PUBLICATIONS

Mahmoud et al, 'A DOS/LINUX extensible file system', Jul. 1-3, 1997, IEEE, pp. 311-315.*

* cited by examiner

*Primary Examiner*—Uyen Le
*Assistant Examiner*—Cheryl M Shechtman

(57) ABSTRACT

A method in an operating system of a computer for allowing a plurality of application programs to interact with a plurality of subsystems, at least two application programs of the plurality of application programs being associated with two different personalities. The method includes providing a plurality of modules, each of the plurality of modules being associated with at least one personality and configured to interact with one of the plurality of subsystems, at least two modules of the plurality of modules being associated with the two different personalities. The method further includes providing a process state module for tracking personality data associated with the plurality of modules, thereby allowing a first application program of the two application programs to employ a first module of the two modules to interact with a given subsystem of the plurality of subsystems, the first application program and the first module being associated with one of the two different personalities, wherein the two application programs are configured to operate concurrently.

13 Claims, 11 Drawing Sheets

PROCESS FILE SYSTEMS HAVING MULTIPLE PERSONALITIES AND METHODS THEREFOR

BACKGROUND OF THE INVENTION

Files and file operations, such as read, write, open, close, and the like are familiar with computer users and programmers. Because of this familiarity, the file system paradigm has been employed to monitor and manage other processes and entities, which may not, at first glance, be thought of as data storage files.

For example, one of the main functions of an operating system is to manage tasks or processes executed in a computer system. If the data pertaining to the tasks or processes can be represented as files, these tasks or processes can be monitored and/or manipulated and/or controlled using the familiar file system commands. In UNIX, for example, there is provided a process file system or ProcFS to manage the interactions between the applications and the tasks/processes, which have been modeled by files in order to allow the applications to monitor and/or control the tasks/processes using the familiar file system user command and application program interface.

To facilitate discussion, FIG. 1 illustrates a typical ProcFS arrangement in which a ProcFS 102 is employed to facilitate the interactions between applications 104 and a plurality of kernel subsystems 106, 108, 110 and 112. Within each kernel subsystem, there is provided one or more internal kernel data structures, which reflect the status of the associated kernel subsystem and contain information that ProcFS 102 wishes to monitor and/or control. These internal kernel data structures are shown for kernel subsystems 106, 108, 110 and 112 as respective internal kernel data structures 114, 116, 118 and 120.

In the example of FIG. 1, kernel subsystem 106 represents a file descriptor subsystem, which deals with the set of open files for processes in the system. Kernel subsystem 108 represents the scheduler subsystem, which schedules execution entities in the system. Kernel subsystem 110 represents the task/process subsystem, which manages the creation and destruction of threads, processes, and tasks in the system. Kernel subsystem 112 represents the virtual memory subsystem, which manages virtual and/or real memory for the processes. ProcFS 102 and the various kernel subsystems may reside in the operating system's kernel space. Unlike other file systems, the end user cannot add, delete, and modify files in ProcFS.

ProcFS 102 includes a plurality of pseudo-files whose contents are created based on the internal kernel data structures of their respective kernel subsystems. That is, a pseudo-file that is associated with a kernel subsystem reflects the data in the internal data kernel structure of its associated kernel subsystem. If the data within internal kernel data structure 114 of kernel subsystem 106 changes, for example, the content of pseudo-file 130, which is associated with kernel subsystem 106, would correspondingly change.

When an application makes a call into ProcFS 102 to request monitoring and/or controlling one of the kernel subsystems, ProcFS 102 opens the pseudo-file(s) the application is interested in and allows the application to access the contents of the appropriate pseudo-file(s) in order to monitor the operation of the associated task/process in the relevant kernel subsystem and/or to control its operation by writing parameters, for example.

Although the ProcFS arrangement of FIG. 1 (and its variations) has been in use for some time, there are disadvantages. One of the main disadvantages of the ProcFS arrangement of FIG. 1 relates to the monolithic nature of ProcFS 102. In ProcFS 102, the set of pseudo-files (e.g., pseudo-files 130, 132, 134 and 136) as well as the content, format, and file directory hierarchy of each, is determined by the OS engineers at the time of OS creation and is fixed at the time of OS creation. If one of the kernel subsystems is modified, or a new kernel subsystem is desired, ProcFS 102 must be modified as a single unit.

Because there is no industry standard that governs the content, file format, and file directory hierarchy of ProcFS 102, different vendors implement ProcFS 102 differently, and even the same vendor may implement ProcFS 102 differently from version to version. Thus, when a user wishes to make changes to one of the kernel subsystems or wishes to introduce a new kernel subsystem, the OS engineers who originally designed ProcFS 102 may need to be consulted. Because of the complex nature of operating systems and its various subsystems, it is generally the case that different teams within the company that supplies the OS may need to coordinate in order to change ProcFS 102.

This situation is conceptually illustrated in exemplary FIG. 2, wherein ProcFS team 202 must coordinate with file system team 204, process management team 208, virtual memory team 210, as well as with individuals outside of OS company 212 (such as one or more independent software vendors, ISV 214) in order to create an updated or a new ProcFS 216. The complexity involved in making a change to the prior art ProcFS often results in an undue amount of delay in delivering the updated ProcFS to the customer requesting the change, thus giving rise to customer dissatisfaction.

Furthermore, when application 104 of FIG. 1 makes a call into ProcFS 102, the resultant query into pseudo-file 130 crosses subsystem boundaries. This is an undesirable data coupling behavior from a modularity point of view, which behavior is a direct result of the monolithic nature of ProcFS 102. The data coupling makes maintenance and update of ProcFS 102 unnecessarily complex as well reducing its overall reliability.

Additionally, prior art ProcFS's tend to be designed to work in a single operating environment at a given point in time and is typically specific to a particular version of the operating system by a particular vendor. There are times, however, that a customer may wish to concurrently execute different applications, each of which being associated with a different operating system, a different version, and/or a different vendor, on a given computer system and to have the ability to employ the ProcFS to monitor/control the various kernel subsystems. It would be desirable to provide a ProcFS that is compatible with those multiple applications and to allow the different applications to access such a ProcFS without requiring the applications to be reprogrammed to use a different ProcFS pathname and/or without requiring rebooting a differently configured system.

SUMMARY OF THE INVENTION

The invention relates, in one embodiment, to a process file system in an operating system of a computer. The process file system is configured for allowing a plurality of application programs to obtain information pertaining to a plurality of subsystems, at least two of the plurality of application programs being associated with two different personalities. The process file system includes a virtual process file system layer for interacting with the plurality of subsystems in a substantially content-independent manner. There is further included a plurality of content-dependent modules, each of the plurality of subsystems being associated with at least one of the plurality of content-dependent modules, a first content-dependent module of the plurality of content-dependent modules being configured to obtain data from a first subsystem of the plurality of subsystems. Additionally, there is included a pre-defined interface facilitating data exchange between the plurality of content-dependent modules and the virtual process file system layer. Furthermore, there is included a plurality of directory structure tables, each of the plurality of directory structure tables being associated with a given personality and containing names of at least a subset of the plurality of content-dependent modules, a name of the first content-dependent module being registered with at least one of the plurality of directory structure tables by the first content-dependent module upon initialization of the first content-dependent module, wherein at least two of the plurality of directory structure tables are associated with the two different personalities.

In yet another embodiment, the invention relates to a process file system in an operating system of a computer. The process file system is configured for allowing a plurality of application programs to interact with a plurality of subsystems, at least two application programs of the plurality of application programs being associated with two different personalities. There is included a plurality of modules, each of the plurality of modules being associated with at least one personality and configured to interact with one of the plurality of subsystems, at least two modules of the plurality of modules being associated with the two different personalities. There is further included a process state module for tracking personality data associated with the plurality of modules, thereby allowing a first application program of the two application programs to employ a first module of the two modules to interact with a given subsystem of the plurality of subsystems. The first application program and the first module are associated with one of the two different personalities, wherein the two application programs are configured to-operate concurrently.

In yet another embodiment, the invention relates to a method in an operating system of a computer for allowing a plurality of application programs to interact with a plurality of subsystems, at least two application programs of the plurality of application programs being associated with two different personalities. The method includes providing a plurality of modules, each of the plurality of modules being associated with at least one personality and configured to interact with one of the plurality of subsystems, at least two modules of the plurality of modules being associated with the two different personalities. The method further includes providing a process state module for tracking personality data associated with the plurality of modules, thereby allowing a first application program of the two application programs to employ a first module of the two modules to interact with a given subsystem of the plurality of subsystems, the first application program and the first module being associated with one of the two different personalities, wherein the two application programs are configured to operate concurrently.

In still another embodiment, the invention relates to a method in a computer for facilitating concurrent interaction between a plurality of application programs and a plurality of subsystems using a plurality of modules, each of the plurality of application programs being associated with a different personality. The method includes receiving at switching logic a first access request from a first application program of the plurality of application programs, the first access request pertaining to a first subsystem of the plurality of subsystems. The method additionally includes ascertaining a name of a first module to service the first access request, the ascertaining the name of the first module being responsive to a personality associated with the first application program. The method additionally includes servicing the first access request using the first module. The method further includes receiving at the switching logic a second access request from a second application program of the plurality of application programs, the second access request pertaining to the first subsystem. The method additionally includes ascertaining a name of a second module to service the second access request, the ascertaining the name of the second module being responsive to a personality associated with the second application program, wherein the second module is different from the first module and the personality associated with the first application program is different from the personality associated with the second program. The method also includes servicing the second access request using the second module, wherein the first access request and the second access requests are both serviced without requiring a reboot of the computer.

In another embodiment, the invention relates to a method in a computer for facilitating concurrent interaction between a plurality of application programs and a plurality of subsystems, each of the plurality of application programs being associated with a different personality. The method includes receiving at switching logic a first access request from a first application program of the plurality of application programs, the first access request pertaining to a first subsystem of the plurality of subsystems. The method includes ascertaining a name of a first module to service the first access request, the ascertaining the name of the first module being responsive to a personality associated with the first application program. The method additionally includes servicing the first access request using the first module. The method includes receiving at the switching logic a second access request from a second application program of the plurality of application programs, the second access request pertaining to a second subsystem different from the first subsystem. Further, the method includes ascertaining a name of a second module to service the second access request, the ascertaining the name of the second module being responsive to a personality associated with the second application program, wherein the second module is different from the first module and the personality associated with the first application program is different from the personality associated with the second program. Additionally, the method includes servicing the second access request using the second module, wherein the first access request and the second access requests are both serviced without requiring a reboot of the computer.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
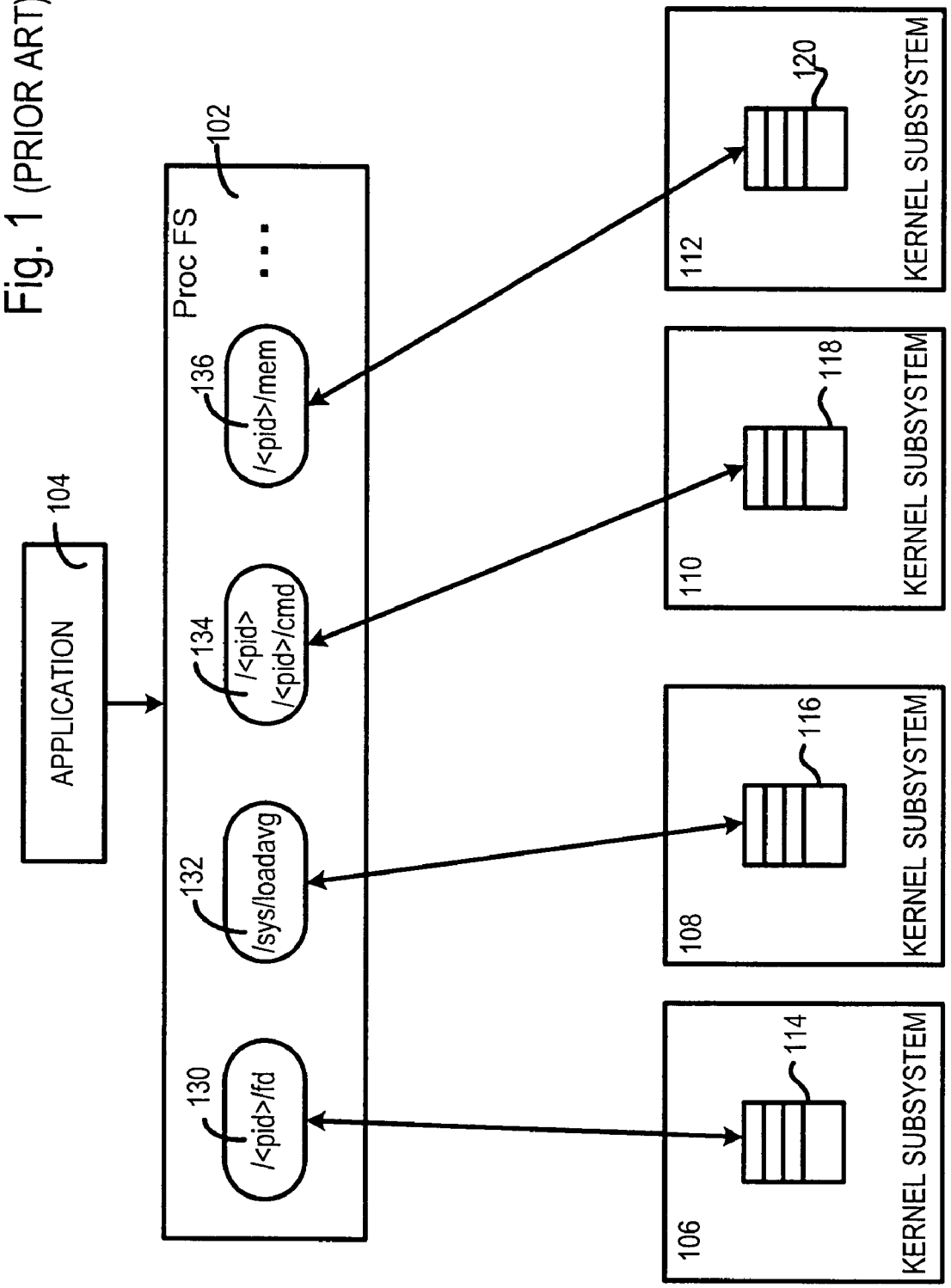
FIG. 1 illustrates a typical ProcFS arrangement in which a ProcFS is employed to facilitate the interactions between the applications and a plurality of kernel subsystems.
Figure 2:
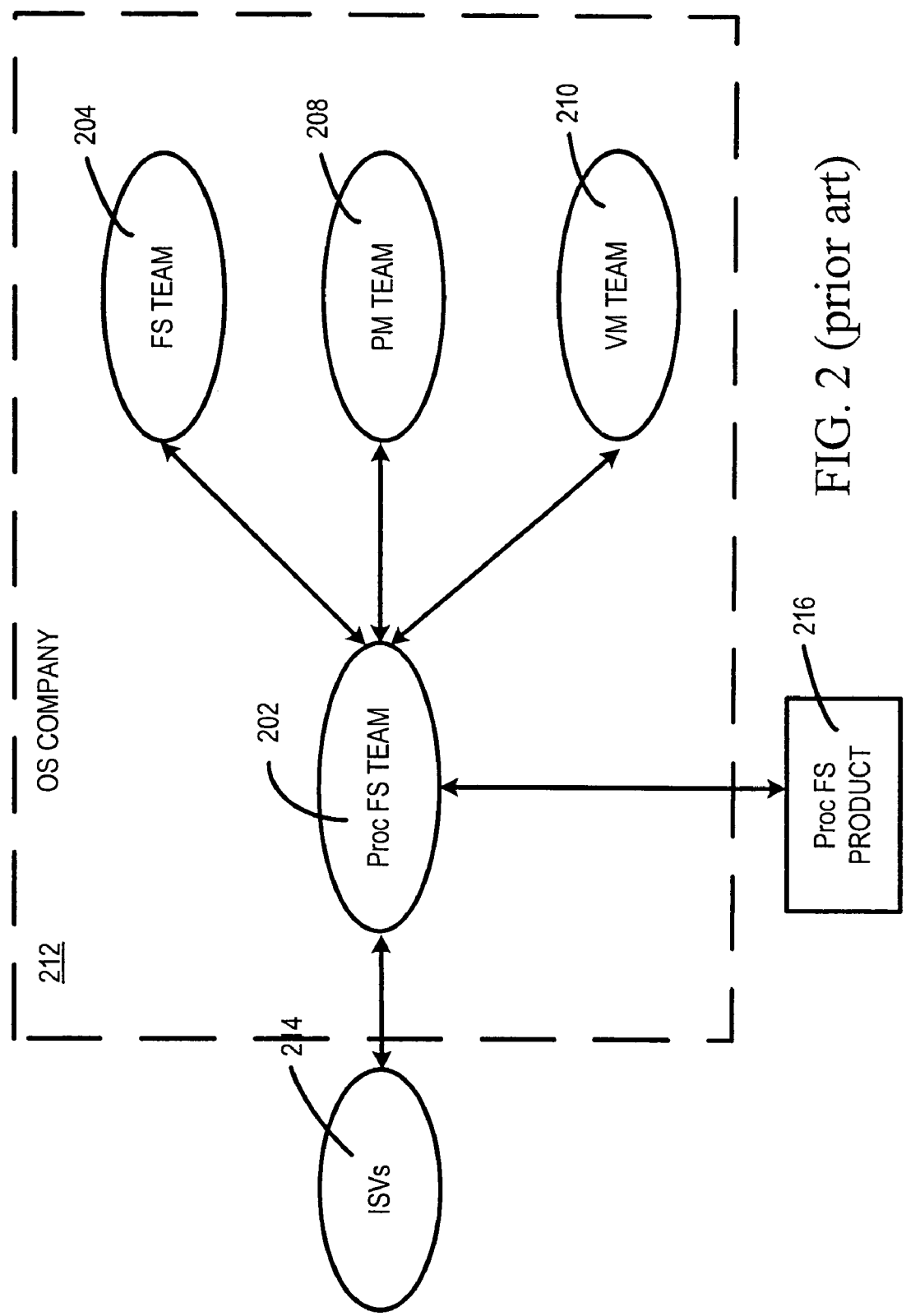
FIG. 2 conceptually illustrates the coordination effort required to update a prior art ProcFS.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, the ProcFS is partitioned into two distinct layers: a virtual ProcFS layer and a content-dependent layer. The virtual ProcFS layer is responsible for interacting with the applications in a substantially content-independent manner, i.e., in a manner that it is substantially independent of the content, format, and file directory hierarchy of the files that reflect the internal kernel data structures within the various kernel subsystems.

The content-dependent layer contains a plurality of content-dependent modules. Each content-dependent module includes the file(s) which reflect the data in the internal kernel data structure of its associated kernel subsystem, as well as any necessary logic to access the internal kernel data structure to reflect the aforementioned data in the file(s). By performing file system-like operations on these files, the applications can monitor and/or control the operation of the kernel subsystems using the familiar file system paradigm.

Between the virtual ProcFS layer and the plurality of content-dependent modules in the content-dependent layer, there is provided a well-defined interface to allow any content-dependent module to register with the virtual ProcFS layer and to communicate therewith. Except through the interface, there is no direct data coupling between the virtual ProcFS layer and the plurality of content-dependent modules.

When a new content-dependent module is loaded into the system, the content-dependent module informs the virtual ProcFS layer of its name and its location to allow the virtual ProcFS layer to subsequently access the content-dependent module, and more specifically the content of the file(s) therein, in order to monitor and/or update the contents of the internal kernel data structures in the kernel subsystem of interest.

In this manner, when a kernel subsystem needs to be updated or a new kernel subsystem needs to be introduced, its associated content-dependent module can be loaded into the system, registered with the virtual ProcFS layer, and the associated content-dependent module can begin to provide information pertaining to its associated internal kernel data structure to the requesting application without requiring changes to other parts of the ProcFS.

Furthermore, there is provided, in accordance with one embodiment of the present invention, a technique for allowing a content-dependent module to register itself even though its exact name as required by the calling application may be unknown until the time the content-dependent module is called by the application. In one embodiment, simple enumerations in the user/application view are represented in the virtual ProcFS layer view in accordance with an inventive naming convention for representing dynamic names. Dynamic names registered at registration time are then dynamically generated into name instances when the modules are called by the applications.

By allowing content-dependent modules to register themselves using dynamic names, there is advantageously no need to know in advance at registration time the file directory hierarchy and/or the exact names required by the application at execution time. This is important for transient tasks and processes that may come and go, and facilitates plug-and-play replacement and/or addition of content-dependent modules.

Figure 3:
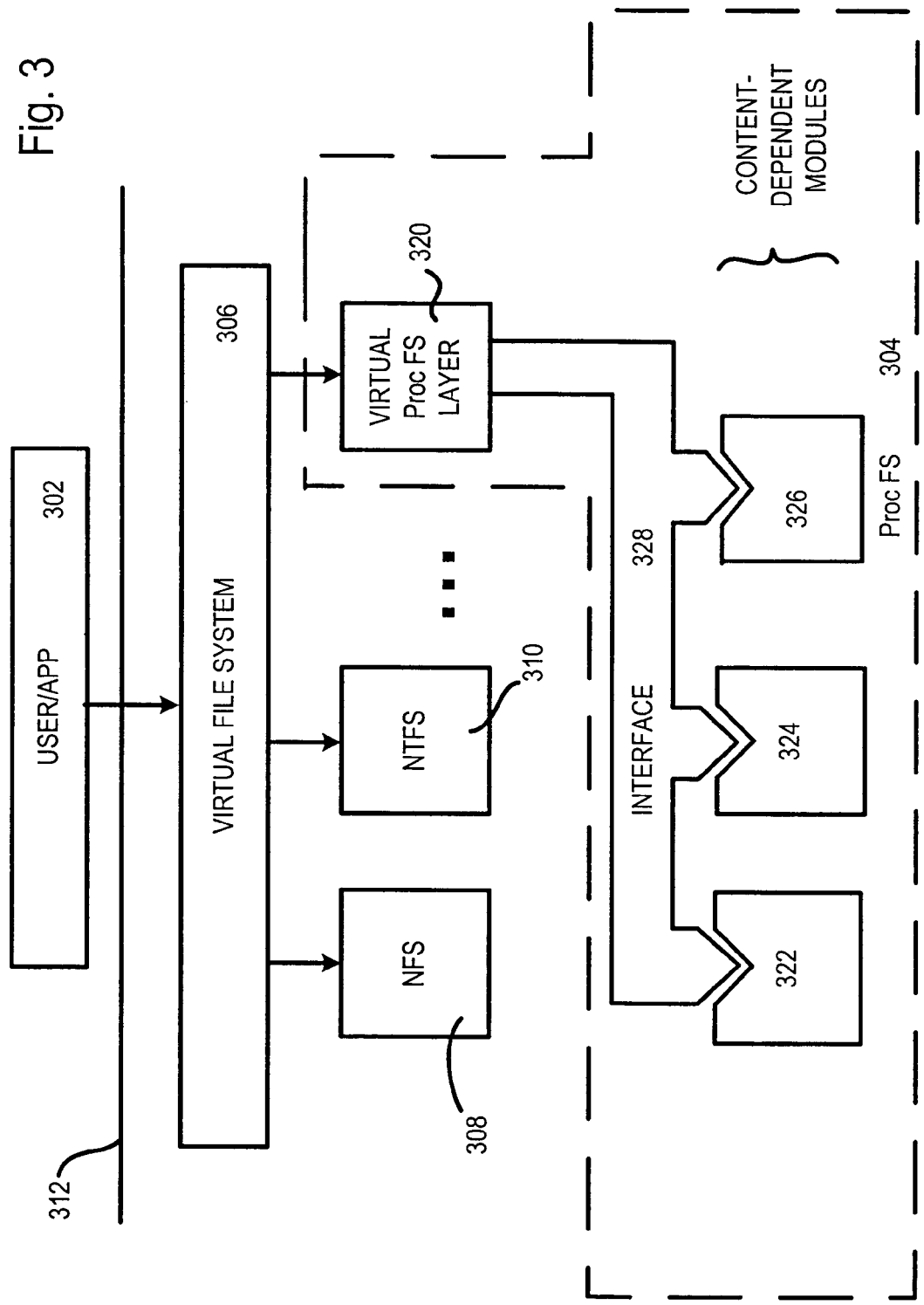
FIG. 3 shows, in accordance with one embodiment of the present invention, a simplified architecture diagram of the ProcFS system in which the ProcFS has been partitioned into a virtual ProcFS layer and a content-dependent layer.

The features and advantages of the present invention may be better understood with reference to the drawings and discussions that follow. FIG. 3 shows, in accordance with one embodiment of the present invention, a simplified architecture diagram of the ProcFS system in which the ProcFS has been partitioned into a virtual ProcFS layer and a content-dependent layer. User-application 302 accesses ProcFS 304 via a virtual file system 306. A line 312 delineates the user space, which is above line 312, from the kernel space of the operating system, which is drawn below line 312.

Virtual file system 306 supports multiple individual file systems and contains the abstractions of the individual file systems so that the applications can make high-level calls (such as read, write, seek, open, load, and the like) without having to know the specifics of the individual file systems. Exemplary file systems shown in FIG. 3 include ProcFS 304, NFS (Network File System) 308, NTFS (Windows NT File System) 310, and the like. Thus, ProcFS is seen as another file system from the perspective of the applications.

ProcFS 304 itself is further partitioned into a virtual ProcFS layer 320 and a content-dependent layer containing a plurality of content-dependent modules 322, 324 and 326. A common interface 328 allows any content-dependent module to load itself into ProcFS 304, to register itself with virtual ProcFS layer 320, and to render the contents of its file(s) accessible to application 302 in a substantially content-independent manner.

Figure 4:
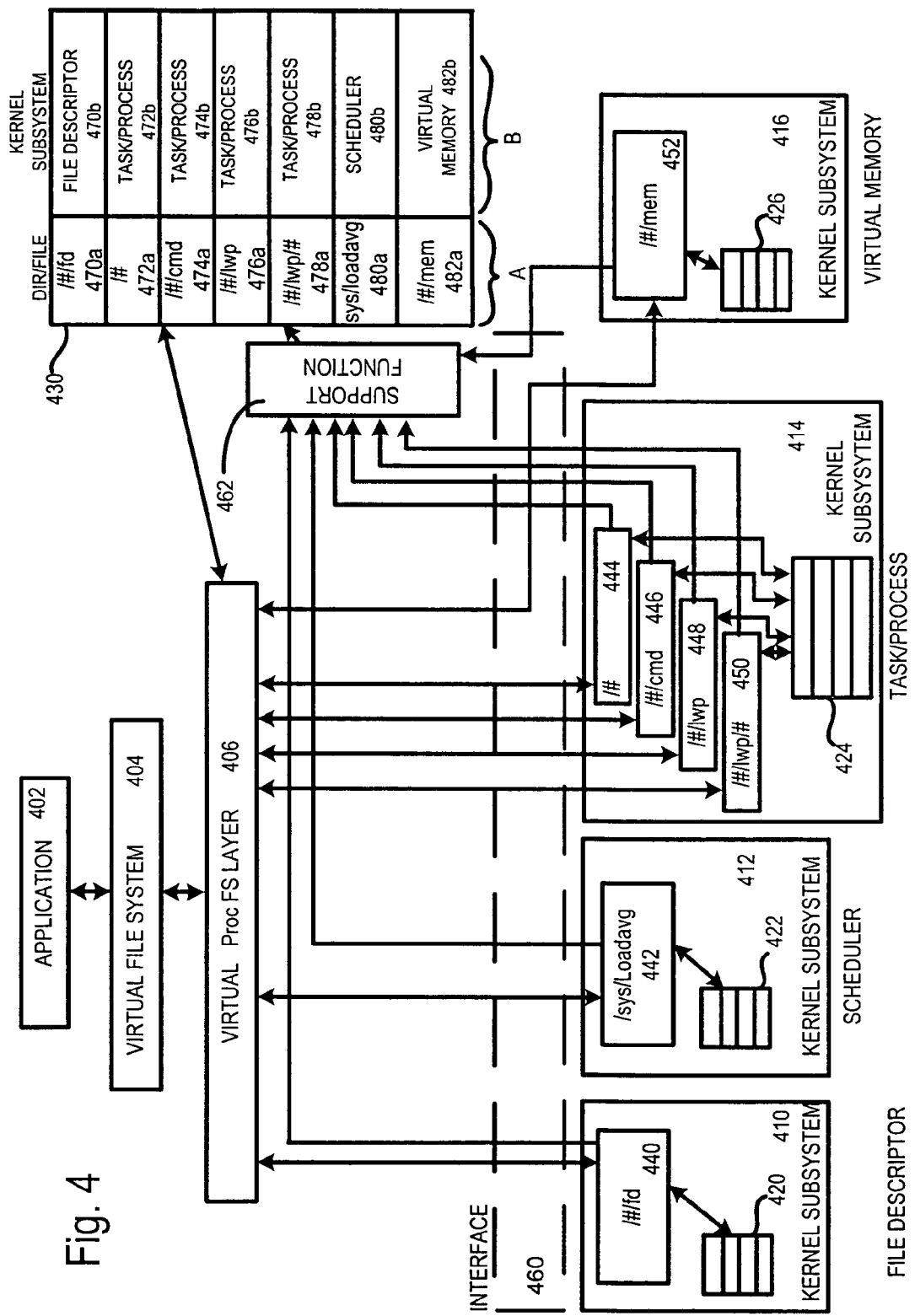
FIG. 4 shows in greater detail, in accordance with one embodiment of the present invention, a ProcFS arrangement in which the ProcFS has been partitioned into a virtual ProcFS layer and a content-dependent layer.

FIG. 4 shows in greater detail, in accordance with one embodiment of the present invention, a ProcFS arrangement in which the ProcFS has been partitioned into a virtual ProcFS layer and a content-dependent layer. In FIG. 4, application 402 accesses the ProcFS through a virtual file system 404. Virtual ProcFS layer 406 of the ProcFS receives a request from application 402 via virtual file system 404, which request may pertain to, for example, a request to monitor data within internal kernel data structures associated with kernel subsystems 410, 412, 414 or 416.

In the example of FIG. 4, kernel subsystem 410 represents the file descriptor subsystem; kernel subsystem 412 represents the scheduler subsystem; kernel subsystem 414 represents the task/process subsystem; and kernel subsystem 416 represents the virtual memory subsystem. Within each kernel subsystem of FIG. 4, there is shown an internal kernel data structure. Internal kernel data structures 420, 422, 424 and 426 correspond to respective kernel subsystems 410, 412, 414 and 416 of FIG. 4.

After receiving the request from application 402, virtual ProcFS layer 406 consults a directory structure table 430 to ascertain the name of the content-dependent module responsible for providing the requested data. The name of the responsible content-dependent module is typically derived from the parameters given by application 402. The lookup provides the name of the responsible content-dependent module, which is then employed by virtual ProcFS layer 406 to access the file or files associated with the content-dependent module. As mentioned, the contents of the file or files provided in the content-dependent module reflect(s) the data in the internal kernel data structure within the kernel subsystem of interest to the calling application.

For example, if a lookup reveals that application 402 wishes to access information pertaining to kernel subsystem 410, virtual ProcFS layer 406 would look up the name of content-dependent module 440 associated with kernel subsystem 410 and employs the content-dependent module 440 to provide the data contents of the file to allow application 402 to monitor the data in internal data kernel data structure 420 of kernel subsystem 410.

The details required to access internal kernel data structure 420 are encapsulated within content-dependent module 440. That is, virtual ProcFS layer 406 is not required to know the details regarding the content and format of internal kernel data structure 420 to service the request by application 402. Furthermore, virtual ProcFS layer 406 does not need to know the exact directory hierarchy required for calling content-dependent module 440 since this information is encapsulated in directory structure table 430. Directory structure table 430 itself is maintained by the content-dependent modules and support module 462. A similar arrangement exists with respect to kernel subsystems 412 and 416 in that each is associated with a content-dependent module (442 and 452 respectively).

There is shown associated with kernel subsystem 414 a plurality of content-dependent modules 444, 446, 448 and 450. Multiple content-dependent modules can be provided for a given kernel subsystem to provide different information to the virtual ProcFS layer. As shown in FIG. 4, the communication between virtual ProcFS layer 406, the various content-dependent modules, and support function 462 is accomplished via a common interface 460. Any content-dependent module written to conform to common interface 460 may be dynamically loaded into and removed from the ProcFS arrangement of FIG. 4 without requiring changes to other parts of the ProcFS system.

FIG. 4 also shows a support module 462. One of the main functions of support module 462 is to provide for the registration of content-dependent modules into directory structure table 430, and the removal of the entries from directory structure table 430 when a given content-dependent module is unloaded. When the module is first initialized, either at system initialization or when the content-dependent module is dynamically loaded, the content-dependent module calls support module 462 to register itself with directory structure table 430. Among the information provided to directory structure table 430 are the name of the content-dependent module and the memory address of the content-dependent module so that the content-dependent module can be called upon by the virtual ProcFS layer 406 when virtual ProcFS layer 406 consults directory structure table 430 in response to a request by application 402. Support module 462 also performs other housekeeping functions, such as memory management, buffer management, tracking the content of the register states, and the like.

Because virtual ProcFS layer 406 is not required to know the details regarding the content or format of the internal kernel data structure within the kernel subsystems, and in fact is not required to know the exact directory hierarchy in directory structure table 430, there is no need to change virtual ProcFS layer 406 when a kernel subsystem is updated or a new kernel subsystem is loaded. As long as the content-dependent module (which encapsulates the details necessary to access the internal kernel data structure of the kernel subsystem of interest) conforms to common interface 460, neither virtual ProcFS layer 406 nor other content-dependent modules of the ProcFS system needs to be modified.

Since the processes or tasks are modeled as files, access to the content-dependent modules follows the file system paradigm and uses a combination of the directory hierarchy path name and file name in order to accomplish the file system-like calls. There are at least two types of entries in the process file system, static and dynamic. Generally speaking, static entries are employed in those cases where the actual names are known at the time of registration. A static entry does not change until the entry is deleted. The static name shown by reference number 442 in FIG. 4 is one such example.

Dynamic entries are those which come into existence when the application/user requests for them. Examples include representation of processes as directories that are named after process id's, representation of threads that are named after thread id's, and the like. Processes and threads are transient that come and go. Accordingly, it is not possible to know in advance at registration time the number and names of processes or threads within a process in the system since they may change from one point in time to the next. To render the virtual ProceFS layer (such as virtual ProcFS layer 406 of FIG. 4) truly virtual and independent of the file organization associated with the content-dependent layer, it is important to be able to accommodate both static and dynamic entries.

In the prior art monolithic model, there was no concept of separate content-independent and content dependent layers. The content/format and directory structure knowledge was built into the monolithic implementation. Even for prior art implementations that support limited plug-ins, such as in the Linux case, the plug-in modules only support static entries and do not support dynamic entries.

In accordance with one aspect of the present invention, an inventive technique is employed to allow a content-dependent module, whose exact name may not be known at the time of registration, to register itself with the directory structure table. One embodiment facilitates the creation of simple enumerations, which are then dynamically generated into name instances when the registered content-dependent modules are called by the application. The technique may use special naming conventions distinct from names used for static entries. In the examples that follow, the hash symbol (#) is employed although other unique symbol or combination of symbols may well be employed.

In the exemplary directory structure table 430, the hash (#) symbol is shown in the module names registered in boxes 469a, 470a, 472a, 474a, 476a, 478a and 482a to denote that these are dynamic names. These names correspond to the content-dependent modules supporting the corresponding subsystems shown in column B of directory structure table 430. An exemplary dynamic entry into directory structure table may relate to the name of the content-dependent module responsible for the identification of tasks existing in the system at any given point in time.

Thus, in exemplary FIG. 4, the dynamic name in box 469a (/#/fd/#) represents the name (including the directory path name and the file name) registered by content-dependent module 441 associated with file descriptor subsystem 410. The dynamic name in box 470a (/#/fd) represents the name (including the directory path name and the file name) registered by content-dependent module 440 associated with file descriptor subsystem 410. The dynamic name in box 472a (/#) represents the name (including the directory path name and the file name) registered by the content-dependent module 444 associated with the task/process subsystem 414. The dynamic name in box 474a (/#/cmd) represents the name (including the directory path name and the file name) registered by content-dependent module 446 associated with task/process subsystem 414. The dynamic name in box 476a (/#/lwp) represents the name (including the directory path name and the file name) registered by the content-dependent module 448 associated with the task/process subsystem 414. The dynamic name in box 478a (/#/lwp/#) represents the name (including the directory path name and the file name) registered by the content-dependent module 450 associated with task/process subsystem 414. The dynamic name associated with box 482a (/#l/mem) represents the name (including the directory path name and the file name) registered by content-dependent module 452 associated with virtual memory subsystem 416.

In box 480a, a static name is registered. In this case, the static name /sys/loadavg represents the name (including the directory path name and the file name) registered by content-dependent module 442 associated with scheduler subsystem 412. Since this name is known at the time it is registered with the directory structure table 430, it is registered as a static name therein.

As one example, suppose the application wants to read the file with the name /proc/3/fd/2. This name contains four indivisible components (proc, 3, fd, and 2). The virtual file system and virtual ProcFS layer perform lookups using these components. Look up of the first component ("proc") by the virtual file system 404 will indicate that further lookup operations should be performed by the virtual ProcFS layer 406, which will eventually forward lookups to the content-dependent modules. Within the virtual ProcFS layer, the name "3/fd/2" is represented three distinct entries in the directory structure table. These entries are shown in box 472a, 470a, and 469a respectively. Accordingly, the second component ("3") will be handled by module 444. The third component ("fd") will be handled by module 440, and the fourth component ("2") will be handled by module 441.

Figure 5A:
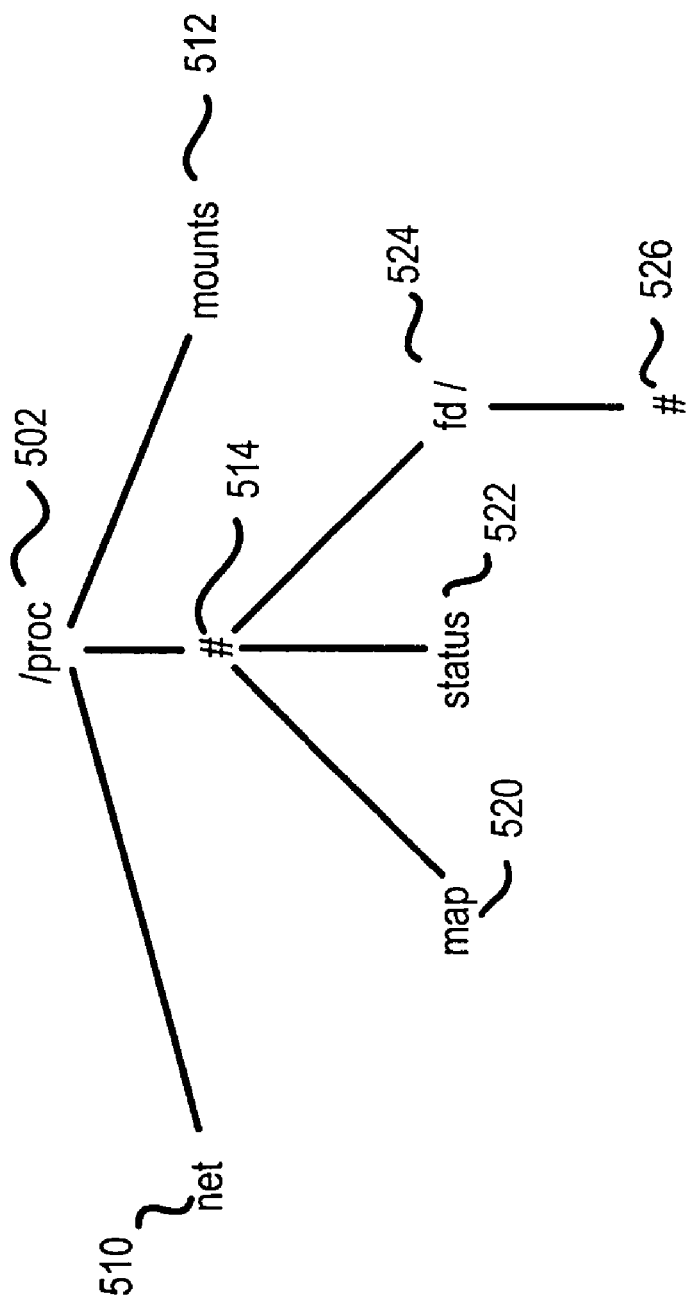
FIG. 5*a* shows, in accordance with one embodiment of the present invention, a virtual ProcFS layer view of an exemplary directory structure as registered by the content-dependent modules.
Figure 5B:
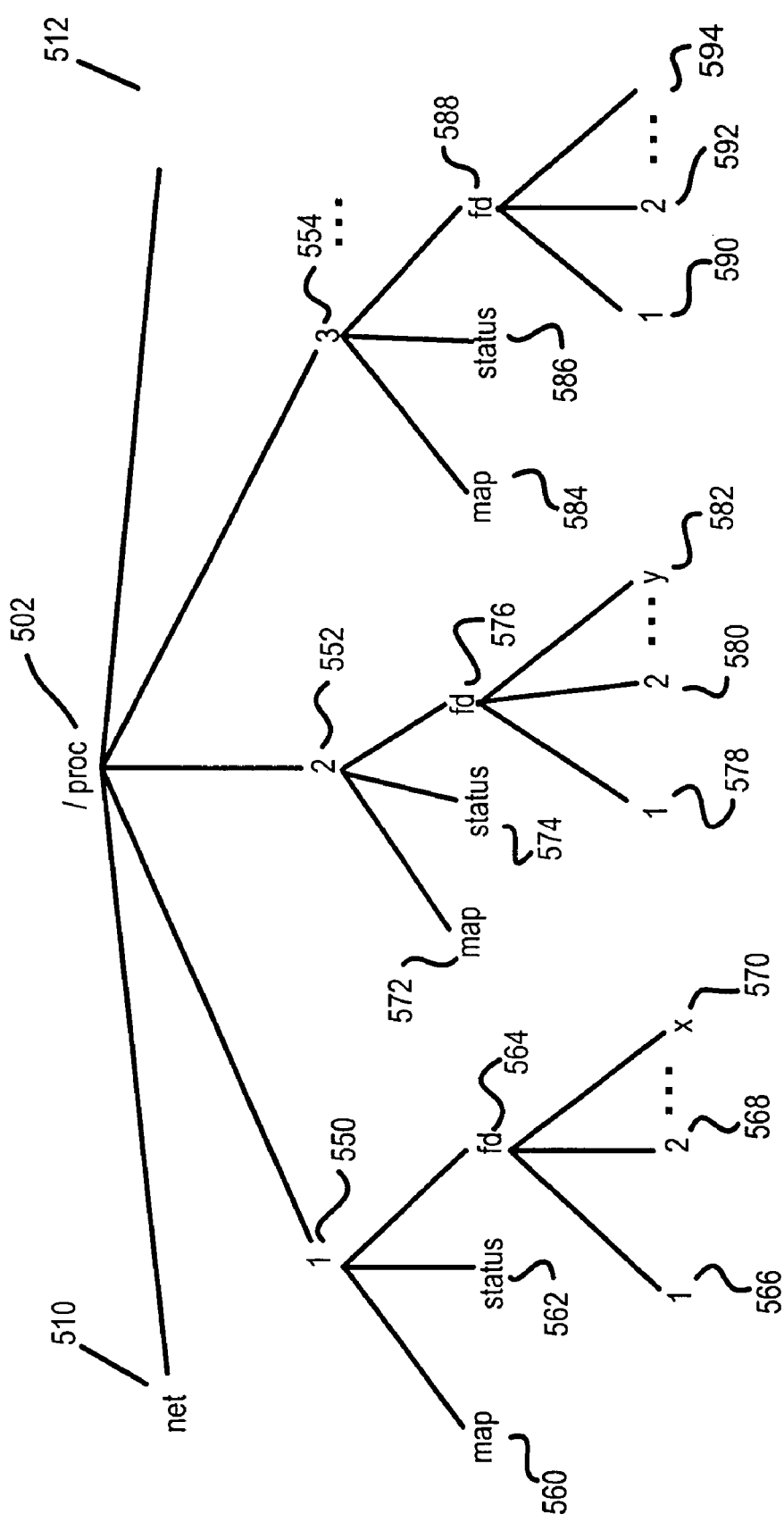
FIG. 5*b* shows, in accordance with one embodiment of the present invention, the application view of the exemplary directory structure of FIG. 5A.

FIG. 5a shows a virtual ProcFS layer view of an exemplary directory structure as registered by the content-dependent modules. FIG. 5b shows the application view of the same exemplary directory structure. In FIG. 5a, the name space is established at the time of registration, but many of the actual names (including exact paths and exact module names) are not known at registration time. For example, in the exemplary directory structure of FIG. 5a, the module name "net" 510 represents a static entry into the directory structure table since the name is known at the time of registration with the directory structure table. Likewise, the module name "mounts" (512) represents another static entry into the directory structure table.

However, the entry 514 is a dynamic entry, and more specifically a dynamic name for a directory. For every instance of subdirectory 514 (represented by the #/), there is a file called "map" (520), a file name "status" (522) and a subdirectory "fd/" (524). Map 520 provides information pertaining to the memory map of the task/process. Status 522 furnishes information pertaining to the status of a process. Status can relate to, for example, how much time the task has been running, what is the status of the task, and the like.

In the example of FIG. 5a, subdirectory "fd/" relates to file descriptors and gives information pertaining to how many files have been opened. Since the number of files opened during execution is not known at registration time, the exact names of the open files are represented by a dynamic entry, which is shown by reference number 526.

FIG. 5b shows the same view of FIG. 5a except that the view in FIG. 5b represents what the application sees at an arbitrary point in time during execution after the virtual ProcFS layer consults the directory structure table. Note that FIG. 5b shows a snapshot of all the instances of dynamic entries, which is often not the case as the virtual ProcFS layer may consult and instantiate the names for only a subset of the entries in the directory structure table at any given point in time during execution.

In FIG. 5b, the static entries 510 and 512 are as discussed in connection with FIG. 5a. There are three instances of dynamic subdirectory 514, which are shown by reference numbers 550, 552 and 554 of FIG. 5b. Each instance of dynamic subdirectory 514 includes all the files/subdirectories under that subdirectory instance, which are shown in FIG. 5a by reference numbers 520, 522, 524 and 526. Thus, the dynamic directory instance 550 includes a map file 560, a status file 562, and a file descriptor subdirectory 564 containing file descriptor files of which there are X number of instances (shown by reference numbers 566, 568 and 570). The dynamic directory instance 55w includes a map file 572, a status file 574, and a file descriptor subdirectory 576 containing file descriptor files of which there are Y number of instances (shown by reference numbers 578, 580 and 582). The dynamic directory instance 554 includes a map file 584, a status file 586, and a file descriptor subdirectory 588 containing file descriptor files of which there are Z number of instances (shown by reference numbers 590, 592 and 594). In this example, X, Y, and Z can be any arbitrary number of integers and although only three instances of the dynamic subdirectory 514 is shown in FIG. 5b, there may be any number of dynamic directory instances. Also, the enumerations derived from the dynamic names do not need to be sequential at all points in time as instances are created and removed from time to time.

Note that in FIG. 5b, although there are three instances of the map files (shown by reference numbers 560, 572 and 584) for the three instances of the dynamic subdirectory 514, the contents of each of these map files may be different because they are associated with different processes altogether.

In accordance with one aspect of the present invention, support module 462 also keeps track of the parent and grandparent of a particular content-dependent module so that the context can be known when the exact module name instances are dynamically generated. The tracking by support module 462 starts when the application opens a specific instance of the file. For example, the module supporting map when acting on instance 572 must be provided the information that it is within the context of process 2 (reference number 552). The context information is created at the time the specific instance is opened, and employed for subsequent operations on that file until closed.

It is believed that the Linux process file system support the concept of a pseudo-virtual ProcFS layer, which supports static entries (i.e., the addition, deletion and/or modification thereof) whose names are known at the time of registration. It also supports limited operation in the interface between the pseudo-virtual ProcFS layer and the content-dependent modules. However, the Linux process file system does not support dynamic entries and dynamic hierarchies. This information must be built into the pseudo-virtual ProcFS layer of the Linux process file system. Also the operations handled through the interface between the pseudo-virtual ProcFS layer and the content-dependent modules of the Linux process file system do not include name lookups and other control operations. These limitations mean that the Linux process file system cannot support a fully decoupled ProcFS system, as disclosed herein, in which the virtual ProcFS layer can access the modules in an entirely content-independent manner and the content-specific information is encapsulated within the content-dependent modules.

Figure 6:
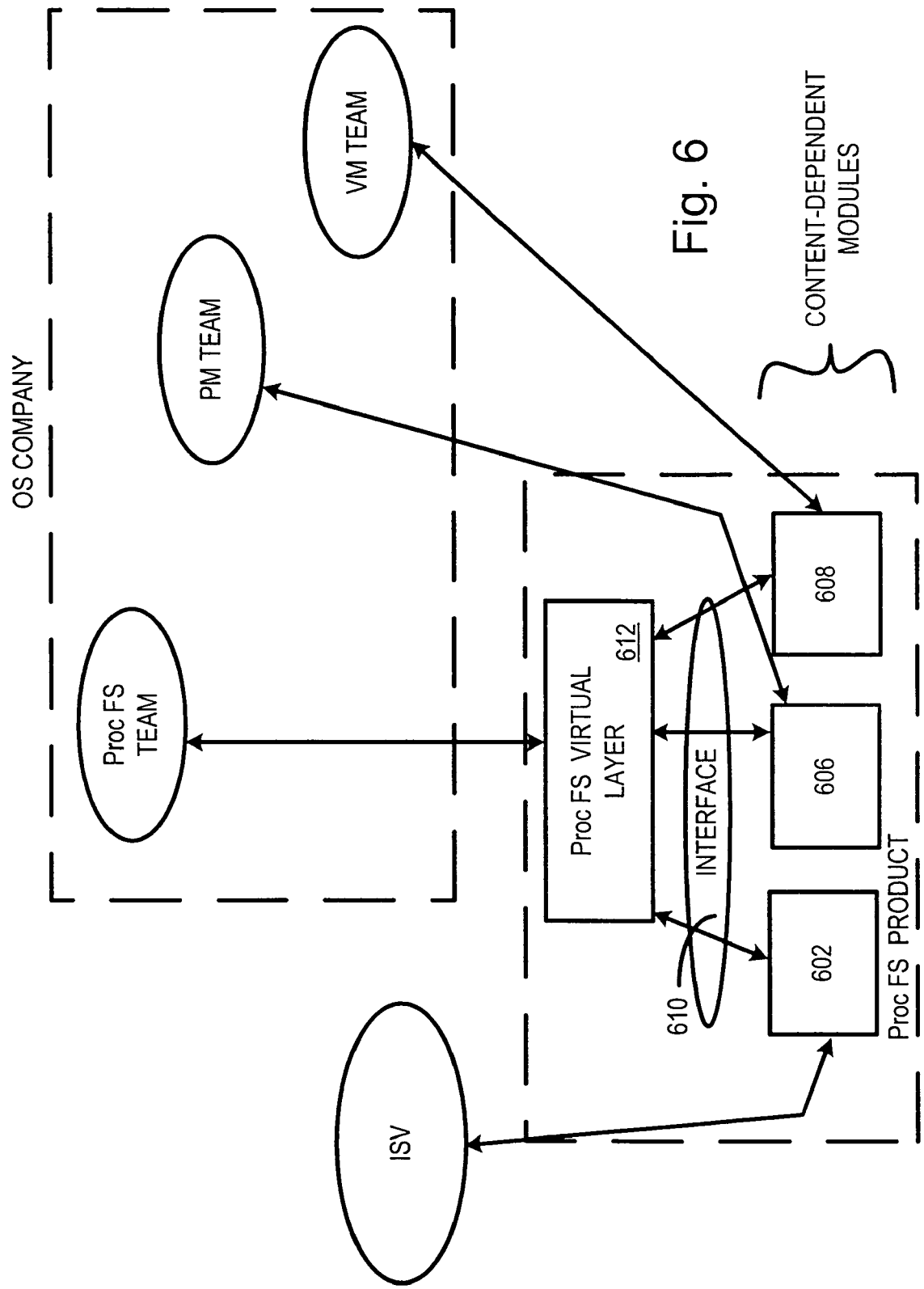
FIG. 6 conceptually illustrates, in accordance with one embodiment of the present invention, the ability of the inventive procFS to allow individual content-dependent modules to be dynamically loaded during an update cycle.

FIG. 6 is a symbolic diagram showing that due to the partitioning of the ProcFS into the virtual ProcFS layer and the content-dependent layer, the use of the common interface, and the ability to allow content-dependent modules whose names may not be known at the time of registration to register and used by the ProcFS layer, it is possible for the ISV supplied module 602 to be dynamically loaded into ProcFS 604 independently, the ProcFS management module 606 to be dynamically loaded into ProcFS 604 independently, and the virtual memory content-dependent module 608 to be dynamically loaded into ProcFS 604 independently.

These dynamically loaded modules 602, 606 and 608, when written to conform with the requirement of the common interface 610, can communicate with the virtual ProcFS layer 612 in a substantially data decoupled manner. A change in one of the kernel subsystems would require a corresponding change only in its associated content-dependent module without impacting either a virtual ProcFS layer 612, other content-dependent modules, the remainder of the directory structure table, or the support module.

It is not necessary for any single team to know the details regarding the content, format, and directory hierarchy associated with any other module other than the one which that team is responsible for. Also, it is not required for any single team to coordinate the effort with other teams in order to come up with an updated ProcFS system. Accordingly, any change to the ProcFS can be accomplished with minimal transaction cost and delay, enhancing customer satisfaction.

The data coupling issue of the prior art is substantially eliminated by the use of the common interface and the virtual ProcFS layer, which does not require any knowledge of the details of the content and format of the various internal kernel data structures. Thus, individual content-dependent modules associated with individual kernel subsystem can be updated and/or dynamically loaded into the ProcFS at any time and the dynamic scheme of name registration allows the modules to register without requiring any advance knowledge of the execution-time name.

In certain cases, it is highly desirable to allow multiple applications associated with different personalities to be able to concurrently access the ProcFS in order to monitor and/or control the kernel subsystems. As the term is employed herein, a personality is defined by a unique combination of operating system environment (e.g., Unix, Solaris, Windows, Linux, etc.), vendor (e.g., Sun, HP, Microsoft, VALinux, etc.), operating system version and/or ProcFS version. An application having a given personality may differ from another based on its associated operating system environment and/or supplied vendor and/or version. Furthermore, when applications having different personalities are said to access the ProcFS concurrently, these applications which are associated with different personalities may access the ProcFS at the same or different times without requiring the application to be reprogrammed to use a different ProcFS pathname and/or without requiring rebooting a differently configured system. By way of example, application A associated with one personality and application B associated with another personality are said to access the ProcFS concurrently or interact with the subsystems concurrently via the ProcFS if application A and application B can both access the ProcFS or interact with the subsystems via the ProcFS without requiring rebooting a differently configured system in between the accesses/interactions.

The ability to allow multiple applications associated with different personalities to be able to concurrently access the ProcFS is particularly useful for vendors who wish to offer computer systems that are compatible with a wide range of applications, including legacy applications, applications associated with different operating system environments, applications associated with the same operating system environment but different versions thereof, applications associated with the same operating system environment but provided by different vendors, and the like. Additionally, the ability to have multiple versions of the ProcFS exist concurrently in a single computer system allows legacy applications to remain viable (using the ProcFS version for which it was originally written) as the vendor makes changes to the ProcFS (which may render the later ProcFS incompatible) and deploy those in the same computer system for use by other applications. Accordingly, the vendor and/or customer is provided with the flexibility to implement different ProcFS with different capabilities in the same system without being limited by compatibility issues.

Furthermore, this ability is highly desirable to vendors who wish to offer their customers server consolidation systems, i.e., computer systems that can consolidate applications previously running on multiple servers so that fewer servers are required in a given cluster/network.

As discussed earlier, there is no industry standard for the content and/or format of the pseudo-files representing the data in the internal kernel data structures of the kernel subsystems, nor is there an industry standard for the directory hierarchies for the purpose of accessing the various ProcFS modules and files involved in furnishing the requested data to the calling applications. Yet each application, irrespective of its personality, requires a particular content and format, which must be satisfied in order for the application to be able to read data from and/or write parameters to the kernel subsystem of interest. Further, each application, irrespective of its personality, expects a particular view of the file directory hierarchy, which must be satisfied in order for the application to make file system-like calls to the right module to obtain the required data.

Figure 7:
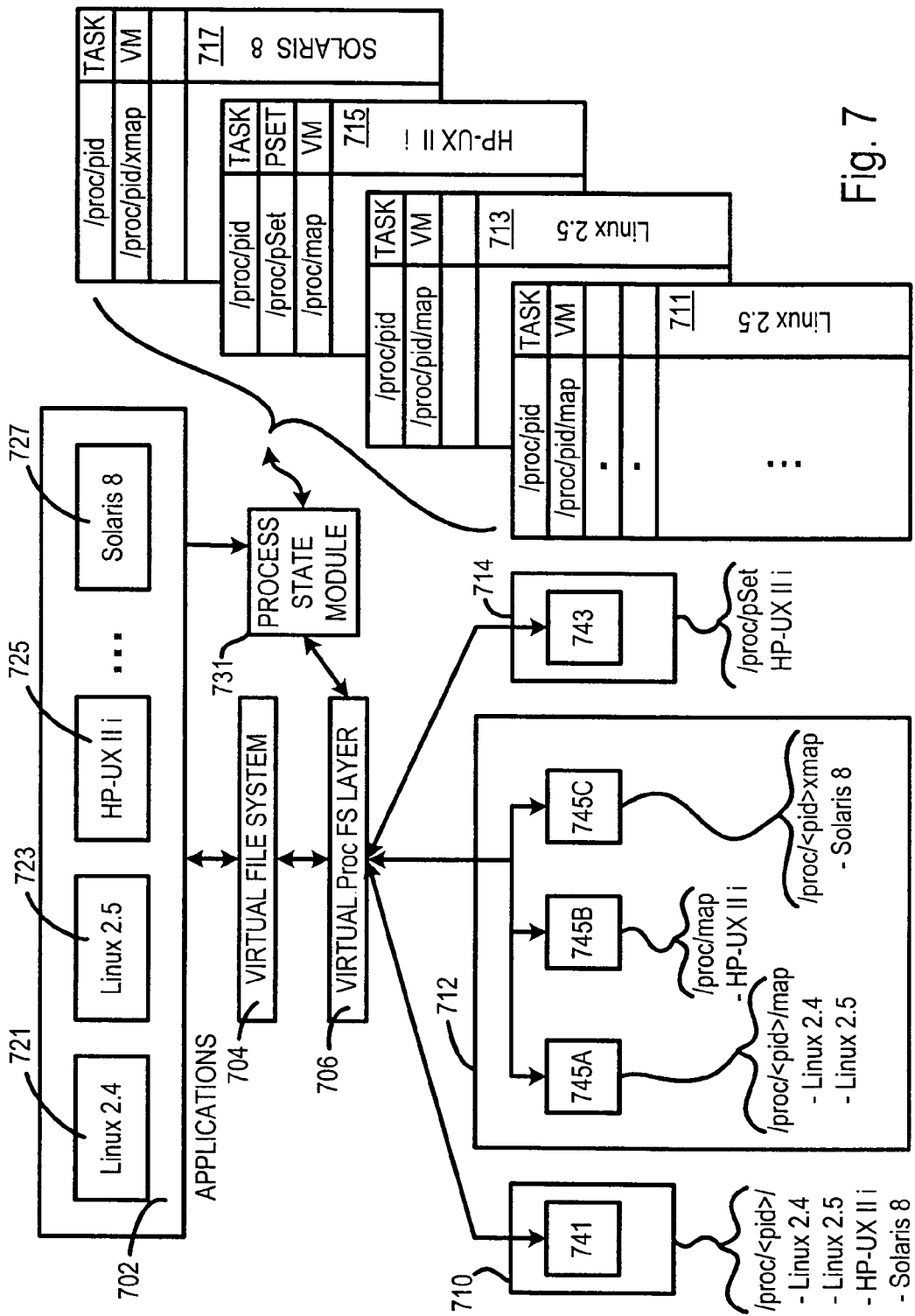
FIG. 7 illustrates, in accordance with one embodiment of the present invention, a simplified architecture diagram of a multiple personality ProcFS (MP-ProcFS).

In accordance with one embodiment of the present invention, there is provided a process file system having multiple personalities for allowing applications associated with different environments and/or different vendors and/or different versions thereof to concurrently employ the multiple personality ProcFS (or MP-ProcFS) to monitor and/or control kernel subsystems. FIG. 7 illustrates, in accordance with one embodiment of the present invention, a simplified architecture diagram of a multiple personality ProcFS (MP-ProcFS). In contrast to the single personality ProcFS arrangement of FIG. 4, there are shown multiple directory structure tables 711, 713, 715 and 717. Each of directory structure tables 711, 713, 715 and 717 corresponds to a personality supported by applications in application block 702.

By way of example, directory structure table 711 supports a Linux 2.4 personality, which corresponds to the personality of an application 721 in application block 702. Directory structure table 713 supports a Linux 2.5 personality, which corresponds to the personality of an application 723 in application block 702. Directory structure table 715 supports a HP-UX 11i personality, which corresponds to the personality of an application 725 in application block 702. Directory structure table 717 supports a Solaris 8 personality, which corresponds to the personality of an application 727 in application block 702.

In FIG. 7, an application in application block 702 accesses the MP-ProcFS through a virtual file system 704. Virtual ProcFS layer 706 of the ProcFS receives a request from an application having a given personality via virtual file system 704, which request may pertain to, for example, a request to monitor data within internal kernel data structures associated with kernel subsystems 710, 712, 714.

In the example of FIG. 7, kernel subsystem 710 represents the task/process subsystem, kernel subsystem 712 represents the virtual memory subsystem, and kernel subsystem 714 represents the pset (process set) subsystem. To simplify the illustration, the internal kernel data structure in each of the subsystems has been omitted from the drawing.

After receiving the request from an application in application block 702, virtual ProcFS layer 706 consults a process state module 731 to ascertain which directory structure table should be employed to look up the content-dependent module responsible for providing the requested data. Process state module 731 tracks, among other pieces of information, data pertaining to the personalities of the applications of application block 702. In general, each application has associated personality data, which may be furnished by the creator of the application. For example, application 727 may contain information furnished by its creator that identifies application 727 as one running under Solaris 8. This personality information is registered with process state module 731, preferably when application 721 is initialized.

Once the appropriate directory structure table is identified, virtual ProcFS layer 706 then employs that directory structure table to ascertain the name of the content-dependent module responsible for providing the requested data. As discussed in connection with FIG. 4, the name of the responsible content-dependent module is typically derived from parameters given by the calling application. The lookup provides the name of the responsible content-dependent module (including the directory data path), which is then employed by virtual ProcFS layer 706 to access the file or files associated with the content-dependent module. As mentioned, the file(s) in the content-dependent module reflect(s) the data in the internal kernel data structure within the kernel subsystem of interest to the calling application.

For example, if application 721 having the Linux 2.4 personality wishes to monitor information pertaining to the task/process subsystem, virtual ProcFS layer 706 would ascertain from process state module 731 that directory structure table 711 (Linux 2.4) should be employed for the subsequent name lookup. Virtual ProcFS layer 706 then looks ups the name of the content-dependent module responsible for serving up the data from task/process subsystem 710. In directory structure table 711, the module name/proc/<pid>/ (which includes both the specific module name and the directory path) is ascertained to be the responsible module, and virtual ProcFS layer 706 then employs the contents of the file in content-dependent module 741 to monitor the data in the internal data kernel data structure of task/process subsystem 710.

Note that the same module name/proc/<pid>/also appears in the directory structure tables 713, 715, and 717 associated with the Linux 2.5 personality, the HP-UX 11i personality, and the Solaris 8 personality respectively. This is because all these personalities employ the same content-dependent module to collect data from task/process subsystem 710. For applications having substantially similar data requirements, this is a highly efficient arrangement as a single module can be adapted to serve the need of multiple applications associated with different personalities.

In contrast, the PSET module 743 only applies to the HP-UX 11i personality. This may happen because, for example, the PSET capability is only implemented in applications running under the HP-UX 11i personality. Thus, the name of PSET module/proc/pset (which includes both the specific name and the directory path) only appears in directory structure table 715 associated with the HP-UX 11i personality.

Consider the virtual memory subsystem 712, which is serviced by three different modules 745A, 745B, and 745C. Although each of content dependent modules 745A, 745B, and 745C allows an application from application block 702 to monitor virtual memory information, each module is tailored to a different personality.

As shown in FIG. 7, module 745A is tailored to the Linux 2.4 and Linux 2.5 personalities. Thus, the name of module 745A /proc/<pid>/map appears in both directory structure tables 711 and 713, which are associated with the Linux 2.4 and Linux 2.5 personalities as mentioned earlier. It is not mandatory, however, that these two personalities have the exact same content/format requirement with respect to virtual memory subsystem 712. It is possible, for example, that the application associated with the Linux 2.5 personality may expect virtual memory information in a different format than that expected by the application associated with the Linux 2.4 personality. In this case, the creator of module 745A may resolve these differences programmatically in module 745A to ensure that data having the right format is delivered to the calling application.

If the expectations are significantly different from personality to personality, it may be more efficient to create a separate module to service a particular personality. Thus module 745B is a virtual memory module that supports the HP-UX 11i personality while module 745C is a virtual memory module that supports the Solaris 8 personality.

Accordingly, the name of module 745B is found in directory structure table 715, which supports the HP-UX 11i personality while the name of module 745C is found in directory structure table 717, which supports the Solaris 8 personality.

With the present invention, there is great flexibility in how the various content-dependent modules may be implemented to support the various personalities. It is possible to employ a single module to service multiple personalities having substantially identical requirements (such as in the case of task/process module 741). It is also possible to employ a single module to service the unique requirements of a single personality (such as in the case of PSET module 743).

Where multiple personalities have slightly different requirements (such as in the case where there is a small incremental change between versions of the same operating system environment), a single module may suffice if its internal logic can adapt the input/output data to the requirements of the various personalities (such as in the case of VM module 745A). This is possible because the personality selection is available to the module. Of course, if the requirements are significantly different from personality to personality, multiple modules, each adapted to a specific personality, may be employed to support a given subsystem. This is the case of VM modules 745B and 745C of FIG. 7.

Figure 8A:
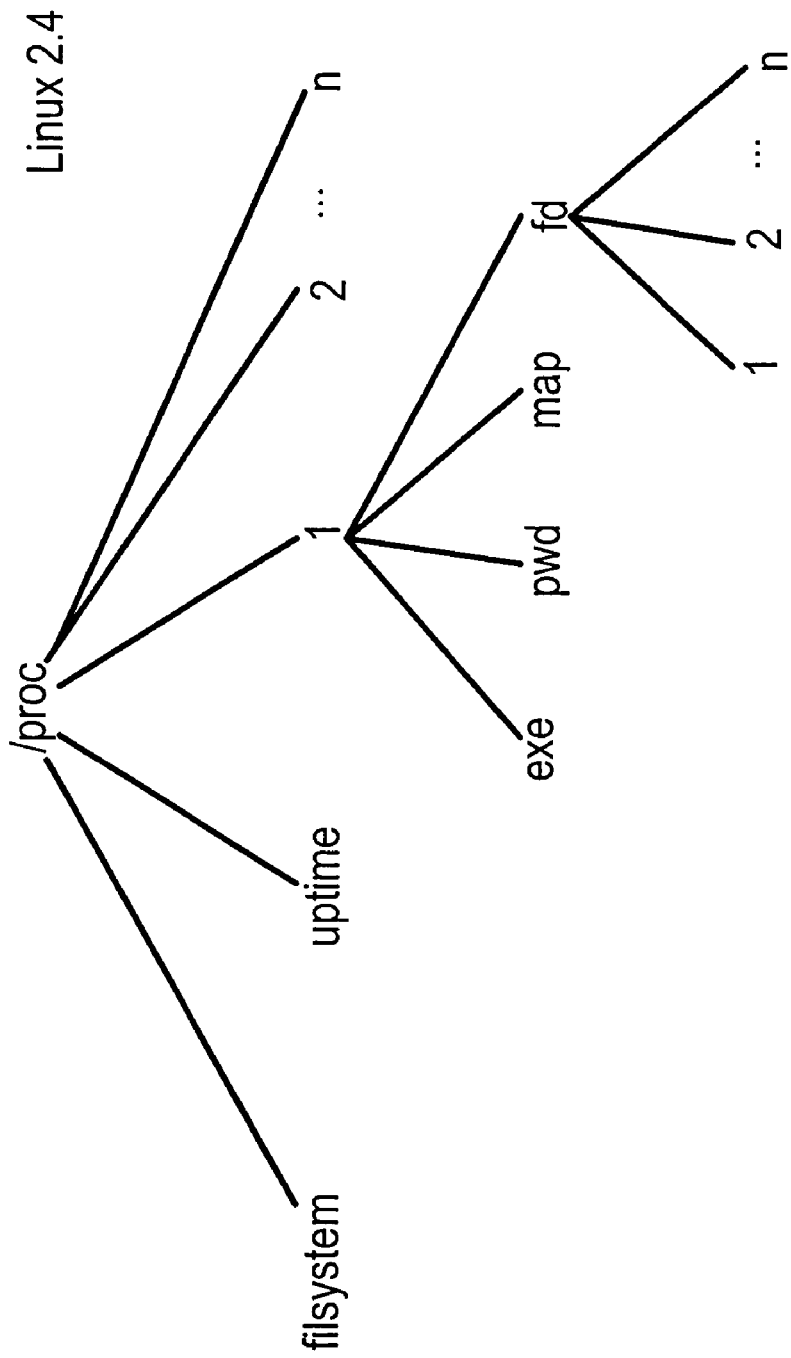
FIGS. 8A and 8B are exemplary illustrations of the directory structures of the MP-ProcFS system for the Linux 2.4 and Solaris 8 personalities, respectively.
Figure 8B:
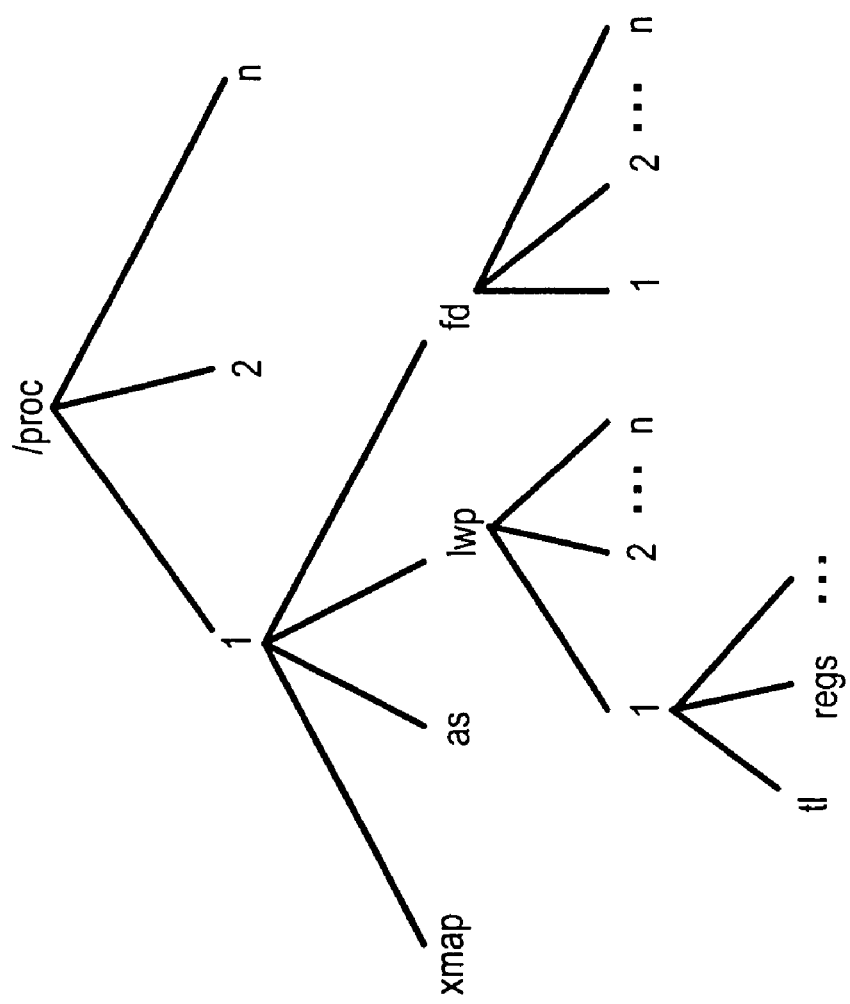

In exemplary FIGS. 5A and 5B above, the directory structure of a single personality is illustrated. Of course when multiple personalities are involved, the file names, the presence or absence of a particular file, and the directory hierarchies may all be different from personality to personality. FIGS. 8A and 8B are exemplary illustrations of the directory structures of the MP-ProcFS system for the Linux 2.4 and Solaris 8 personalities, respectively. In the Linux 2.4 case, the content of the file is in ASCII, whereas the content of the file is binary for the Solaris personality. Furthermore, there may be files present in the Solaris directory hierarchy but not in the Linux 2.4 directory hierarchy, and vice versa. Examples of these files include uptime for the Linux 2.4 personality and regs in the Solaris 8 personality. Even if the files are identical between two personalities, their names may be different and/or their directory paths may be different in their respective directory hierarchies.

The entries in each of directory structure tables 711, 713, 715, and 717 are filled by the modules themselves from the personality information furnished by the module creators. For example, the module creator of task/process module 741 would include data that explicitly or implicitly identifies task/process module 741 has being suitable for use with the Linux 2.4, Linux 2.5, HP-UX 11i, and Solaris 8 personalities. In this case, task/process module 741 would register itself, using the common interface mechanism discussed in connection with FIG. 4, with directory structure tables 711, 713, 715, and 717 either at system initialization or after being dynamically loaded. As another example, the module creator of VM module 745B would include data that explicitly or implicitly identifies VM module 745B has being suitable for use with the HP-UX 11i personality. In this case, VM module 745B would register itself, using the aforementioned common interface mechanism, with directory structure table 715, which is associated with the HP-UX 11i personality, either at system initialization or after being dynamically loaded.

The support module as well as the common interface that enable a content-dependent module to be dynamically loaded and to register itself with a given directory structure table is omitted from FIG. 7 to simplify the drawing. Reference may be made to FIG. 4 and the discussion therein for details. Further, the details pertaining to registration by a module in a given directory structure table, including the use of dynamic names and directories during registration and subsequent execution, have been discussed earlier and will not be repeated here for brevity's sake.

There are various ways with which a given application instance may select which personality (and concomitant which directory structure table) should be employed for the purpose of accessing the MP-ProcFS. As one example, an application instance may explicitly indicate that it is associated with a given personality, e.g., the Solaris 8 personality. The Solaris 8 personality information would be employed by process state module 731 to select directory structure table 717 as the directory structure table for use in accessing the MP-ProcFS by this application instance. As another example, the application instance may inherit its personality from its parent process. Such inheritance may occur, for example, with the UNIX fork( ) system call. In this case, the personality of the parent process, and the directory structure table associated therewith, will be employed for accessing the MP-ProcFS. As another example, if the application instance is a replacement for another process, the replacement application instance may either assume the personality of the process it replaces or may explicitly register its own personality if the replacement application instance has a different personality. An example of this situation is the case when a UNIX exec( ) system call is made.

Thus in the embodiment that partitions the MP-ProcFS into the virtual ProcFS layer and the content dependent layer, the use of a common interface for registration, the ability to allow content-dependent modules whose names may not be known at the time of registration to register and subsequently used by the ProcFS layer all facilitate improved upgradability, extensibility, and modularity. Thus, a single content-dependent module may serve multiple personalities or multiple content-dependent modules may serve multiple personalities.

Figure 9:
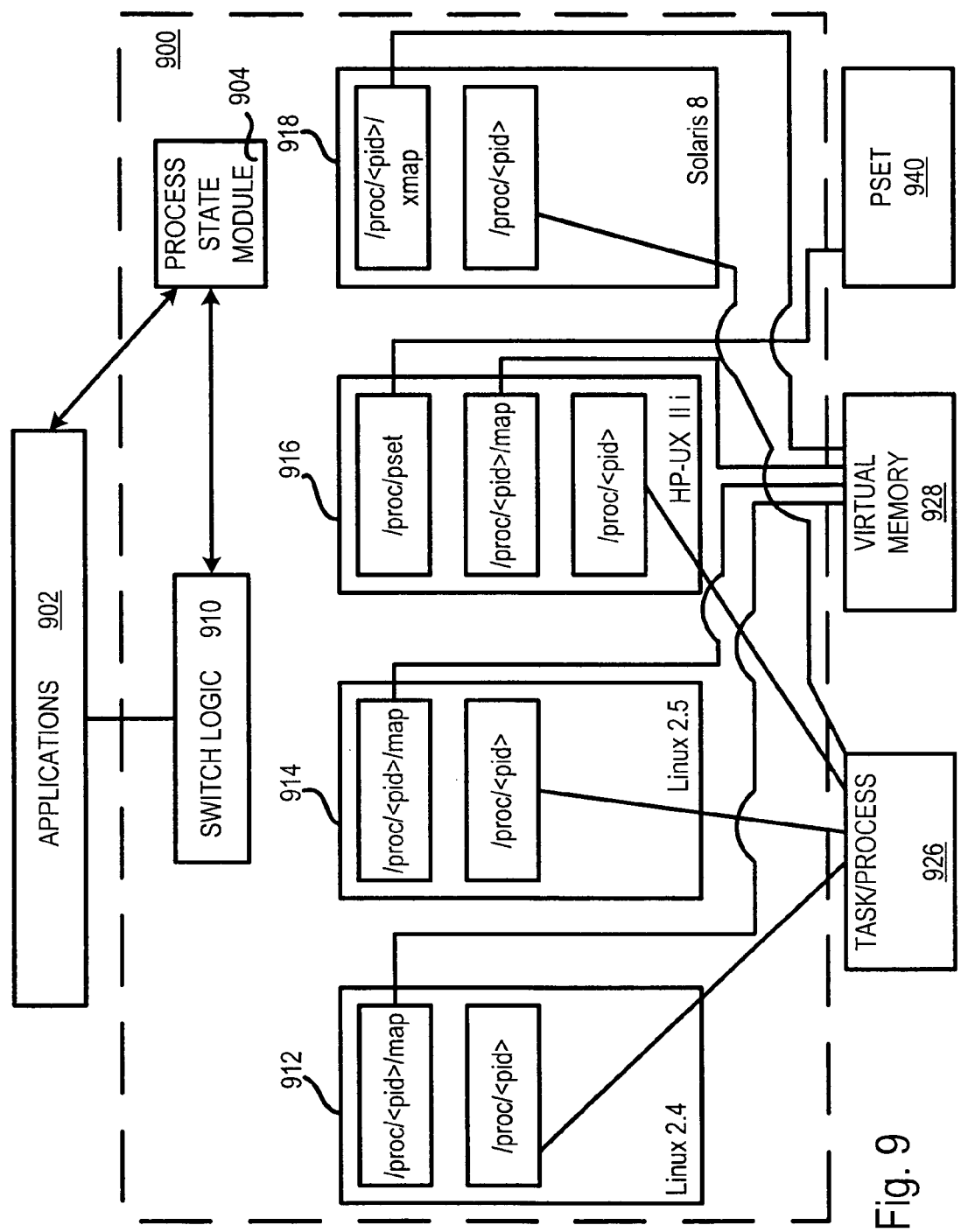
FIG. 9 illustrates, in accordance with another embodiment of the invention, another implementation of a ProcFS having multiple personalities.

Alternatively, the multiple personality concept can also apply to monolithic ProcFS implementations. FIG. 9 shows, in accordance with one embodiment of the present invention, an implementation of such a ProcFS with multiple personalities. With reference to FIG. 9, ProcFS 900 includes four personality-specific sections 912, 914, 916 and 918 corresponding to the Linux 2.4, Linux 2.5, HP-UX 11i, and Solaris 8 personalities respectively. When an application in applications block 902 makes a call to ProcFS 900, switch logic 910 ascertains from process state module 904 which personality should apply. The process state module 904 of FIG. 9 has been discussed earlier, for example, in connection with FIG. 7. The determination made would dictate which of personality-specific sections 912, 914, 916 and 918 would be employed to service the call. Thus, multiple personalities are accommodated for the applications in applications block 902, and codes in each personality-specific section would service the call with respect to the subsystems 926, 928, and 940.

As can be appreciated from the foregoing, the MP-ProcFS allows multiple applications associated with different operating system environments, different versions, and/or different vendors to co-exist in a given computer system and to access the MP-ProcFS concurrently for the purpose of monitoring and/or controlling the kernel subsystems. When a given application wishes to access the MP-ProcFS, it can use the same file name (including directory path) that it previously used in a single-personality computer, and expects that the expected content will be furnished in the expected format. The fact that the ProcFS now can serve multiple personalities concurrently is substantially transparent to the calling application.

Furthermore, the MP-ProcFS can provide the ability to monitor and/or control the transient tasks/processes for applications associated with different personalities without requiring an application to be reprogrammed to use a different ProcFS pathname and/or without requiring rebooting a differently configured system. Advantageously, the MP-ProcFS can provide this capability in any general user/programming computing environment.

While this invention has been described in terms of several preferred embodiments, there are alterations, permutations, and equivalents which fall within the scope of this invention. For example, although the invention has been described in the context of a UNIX example, the inventive methods and apparatus also apply to other operating system environments such as Linux, Windows, and the like. As another example, although one specific exemplary implementation discussed herein positions the virtual ProcFS layer and/or the content-dependent modules in the OS kernel space, the invention also applies to situations where the virtual ProcFS layer and/or the content-dependent modules are implemented in the user/application space or in a combination thereof. As another example, although a specific embodiments discussed herein shows a virtual file system layer, the use of such a virtual file system layer, such as virtual file system 404 of FIG. 4 is not absolutely necessary to practice the invention herein. As a further example, although the use of a special symbol is employed to denote that an entry is a dynamic name, other techniques (such as using a flag) can also be used to signify that a particular entry is dynamic. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In an operating system of a computer, a process file system for allowing a plurality of application programs to obtain information pertaining to a plurality of subsystems, at least two of said plurality of application programs being associated with two different personalities, comprising:
   a virtual process file system layer for interacting with said plurality of subsystems in a content-independent manner;
   a plurality of content-dependent modules, each of said plurality of subsystems being associated with at least one of said plurality of content-dependent modules, a first content-dependent module of said plurality of content-dependent modules being configured to obtain data from a first subsystem of said plurality of subsystems;
   a pre-defined interface facilitating data exchange between said plurality of content-dependent modules and said virtual process file system layer;
   a plurality of directory structure tables, each of said plurality of directory structure tables being associated with a given personality and containing names of at least a subset of said plurality of content-dependent modules, a name of said first content-dependent module being registered with at least one of said plurality of directory structure tables by said first content-dependent module upon initialization of said first content-dependent module, wherein at least two of said plurality of directory structure tables are associated with said two different personalities, wherein said plurality of content dependent modules, said pre-defined interface, and said plurality of directory structure tables enable said virtual process file system layer of said process file system to interact with said plurality of subsystems in said content-independent manner.

2. The process file system of claim 1 wherein said name associated with said first content-dependent module is registered in said at least one of said directory structure tables using a dynamic name.

3. The process file system of claim 1 wherein said first content-dependent module encapsulates content information pertaining to said a data structure associated with said first subsystem.

4. The process file system of claim 1 wherein said first content-dependent module encapsulates format information pertaining to a data structure associated with said first subsystem.

5. The process file system of claim 1 further comprising a support module, said names of said plurality of content-dependent modules being registered with said plurality of directory structure tables using said support module.

6. The process file system of claim 1 wherein said first content-dependent module is registered with a first dynamic name at registration time, said first dynamic name being instantiated into at least one name instance when said application program queries data pertaining to said first subsystem.

7. The process file system of claim 6 wherein said first dynamic name is indicated in said at least one of said plurality of directory structure tables in accordance with a predefined convention.

8. The process file system of claim 6 wherein said first dynamic name includes one of a predefined symbol and a predefined combination of symbols, said one of said predefined symbol and predefined combination of symbols indicating a dynamic characteristic of said first dynamic name, said dynamic characteristic including having an execution-time name that is unknown at registration time.

9. The process file system of claim 8 wherein one of said predefined symbol and predefined combination of symbols in said first dynamic name represents a dynamic directory path.

10. The process file system of claim 1 further comprising a process state module containing personality data of said plurality of application programs, said virtual process file system layer consults said process state module to ascertain which of said plurality of directory structure tables to employ in accessing a given content-dependent module of said plurality of content-dependent modules.

11. The process file system of claim 1 wherein said two different personalities pertain to two different operating system environments.

12. The process file system of claim 1 wherein said two different personalities pertain to products by two different vendors.

13. The process file system of claim 1 wherein said two different personalities pertain to two different versions of a given operating system environment.

* * * * *

UNITED STATES PATENT AND TRADEMARK OFFICE
CERTIFICATE OF CORRECTION

PATENT NO.         : 7,107,289 B2                                             Page 1 of 1
APPLICATION NO.    : 10/293043
DATED              : September 12, 2006
INVENTOR(S)        : Edward J Sharpe et al.

It is certified that error appears in the above-identified patent and that said Letters Patent is hereby corrected as shown below:

On the Title page, in field (73), under "Assignee", in column 1, line 2, after "Company," insert -- L.P. --.

Signed and Sealed this

Fourth Day of August, 2009

JOHN DOLL
*Acting Director of the United States Patent and Trademark Office*